United States Patent [19]

Scibelli

[11] 4,200,662
[45] Apr. 29, 1980

[54] FORTIFICATION OF SOFT DRINKS WITH PROTEIN

[75] Inventor: Gabriele E. Scibelli, New Rochelle, N.Y.

[73] Assignee: Stauffer Chemical Company, Westport, Conn.

[21] Appl. No.: 908,486

[22] Filed: May 22, 1978

Related U.S. Application Data

[63] Continuation of Ser. No. 739,371, Nov. 5, 1976, abandoned.

[51] Int. Cl.$^2$ .................. A23L 2/02; A23C 21/00; A23C 23/00
[52] U.S. Cl. .................. 426/583; 426/580; 426/588; 426/590
[58] Field of Search .................. 426/583, 580, 590, 491, 426/616, 588

[56] References Cited

U.S. PATENT DOCUMENTS

| | | | |
|---|---|---|---|
| 3,800,052 | 3/1974 | Inagami et al. | 426/590 X |
| 3,922,375 | 11/1975 | Dalan et al. | 426/583 |
| 3,949,098 | 4/1976 | Bangert | 426/590 X |
| 3,996,391 | 12/1976 | Inagami et al. | 426/590 |

OTHER PUBLICATIONS

Holsinger, et al., Fortifying Soft Drinks with Cheese Whey Protein, Food Technology, 2/1973, (pp. 59-65).
Horton, et al., Membrane Processing of Cheese Whey Reaches Commercial Scale, Food Technology, 2/1972, (pp. 30-35).

*Primary Examiner*—David M. Naff
*Attorney, Agent, or Firm*—Paul J. Juettner

[57] ABSTRACT

Turbid protein fortified citrus flavored soft drinks can be prepared by adding to the soft drink a protein fortifier of either cheese whey protein concentrate when the final pH of the soft drink is within the range of pH 3.1 to 3.9 or a combination of 50%-95% cheese whey protein concentrate and about 50-5% non-fat dried milk when the pH of the final drink is within the range of from 3.1 to 3.7.

11 Claims, No Drawings

FORTIFICATION OF SOFT DRINKS WITH PROTEIN

CROSS REFERENCE TO RELATED APPLICATIONS

This application is a continuation of application Ser. No. 739,371 filed Nov. 5, 1976 and now abandoned.

BACKGROUND OF THE PRESENT INVENTION

The present invention relates to turbid protein fortified acidic soft drinks.

Acidic soft drinks either carbonated or non-carbonated, especially of the citrus flavored variety, are well known. Because of the large appeal of these beverages to the young and because of their low nutritive value, consideration has been given to fortifying these beverages with protein to make them more nutritious. Much work has been undertaken to provide a protein fortified acidic soft drink. Much of the work has been directed to preparing clear beverages.

A clear beverage has been formed using cheese whey protein concentrate made from cottage cheese whey by ultrafiltration (Holsinger et al., Food Technology, February 1973, p. 59).

Protein fortification of orange juice under conditions that do not favor precipitation of the protein is disclosed in U.S. Pat. No. 3,962,342. Acid soluble protein is combined with starch and a food stabilizer in the orange juice.

Non-precipitation of protein in a milk-fruit juice beverage can also be accomplished with carboxymethyl cellulose (U.S. Pat. No. 3,692,532).

Navel orange juice debittered with vegetable oil can be used in a milk-orange juice beverage as taught in U.S. Pat. No. 3,647,476.

Pear and milk combinations are disclosed in U.S. Pat. No. 3,174,865. The use of pear pulp overcomes the settling problem.

Much of this effort has been directed at obtaining a clear protein enriched soft drink. However, it is desired to provide a turbid soft drink, particularly a citrus flavoredturbid soft drink, which turbidity can be attributed to suspended protein material.

Many denatured whey proteins are known which would produce a protein enriched turbid soft drink. However, the market demands a product in which the turbidty is caused by a stable suspension, i.e., one that does not settle after one month.

BRIEF SUMMARY OF THE INVENTION

In accordance with the present invention, it has been found that turbid protein fortified acidic soft drinks which have a stable suspension of particles therein can be prepared by admixing with said acidic soft drink a protein fortifier composition of either cheese whey protein concentrate when the final pH of the drink is within the range of 3.1 to 3.9 and preferably a pH of 3.7 to 3.9 of a combination of from about 50% to about 95% cheese whey protein and correspondingly, from about 50% to about 5% non-fat dried milk, preferably high heat non-fat dried milk, when the final pH of the drink is within the range of from about 3.1 to about 3.7, said fortifier being used in an amount sufficient to provide at least 0.1% by weight protein in the final drink. Acidic soft drinks, preferably citrus based, can be protein fortified while providing a turbidity which does not settle upon storage. Flavor of the drink is not adversely affected by the fortification. Drinks of both milky and non-milky flavor can be provided. The acidic drinks can be either carbonated or non-carbonated.

As used herein, the term turbidity is intended to mean a cloudy or hazy appearance in a liquid caused by a suspension of colloidal or fine solids.

As used herein, stable suspension is intended to cover suspension both before and after pasteurization which do not settle upon standing for one month.

DETAILED DESCRIPTION OF THE INVENTION

The whey protein concentrate can be derived from any cheese whey. Cheese whey is the by-product of the acid, or rennet coagulation of milk protein (i.e., casein) from milk in the manufacture of cheese. The whey obtained from the acid coagulation is called acid whey and that obtained from rennet, sweet whey.

The acid coagulation of milk protein from milk involves either the addition of lactic acid producing bacteria (e.g., Lactobacillus sp.) or the addition of food grade acids such as lactic (i.e., direct) or hydrochloric acid acidication. Regardless of the method used to acidify milk, acidification is allowed to proceed until a pH of about 4.6 is reached. At this pH, casein becomes insolubilized and coagulates as cheese. The cheese produced by this method is commonly known as cottage cheese. The whey obtained by the separation and removal of this cheese curd is called cottage cheese whey.

Sweet whey is obtained by the separation and removal of coagulated casein produced by the addition of a proteolytic enzyme to milk. The proteolytic enzymes generally used are known as rennin and/or pepsin. Specific examples of cheese products produced by this general method are cheddar cheese, swiss cheese and mozzarella cheese.

The whey protein concentrates can be prepared from acid (cottage) or sweet (cheddar) whey or mixtures thereof. If a milky flavor is desired, the sweet whey source can be used. If a bland flavor is desired, the acid whey is preferred. Blends of acid and sweet can be used when a slight milky flavor is desired.

The preferred cheese whey for use in preparing the concentrates used in the present invention is 100% acid (cottage cheese) whey or blends with up to 20% sweet cheese whey. The more preferred is 100% acid (cottage cheese) whey. The acid whey concentrate has a bland flavor which does not interfere with the other flavors in the drink.

The cheese whey product is required to be a protein concentrate. As used herein, the term concentrate relates to a whey protein product having 25% or more whey protein solids. Such concentrates can be made by a number of processes including: the delactosing of whey; an electrodialysis procedure (e.g., as described by Stribley, R. C., Food Processing, Vol. 24, No. 1, p. 49, 1963); by reverse osmosis; by gel filtration as described in U.S. Patent No. Re. 27,806; by ultrafiltration. An illustrative method for ultrafiltration is described by Horton, B.S. et al., Food Technology, Vol. 26, p. 30, 1972.

It has been found that the most effective results are obtained using an ultrafiltered acid (cottage cheese) whey concentrate containing from about 40% to about 60% and preferably 50%±5% whey protein. In a typical application of such a preferred process, cottage cheese whey is neutralized to a pH 6.4 with 50% caustic. After storage, the pH is then adjusted to 7.2 and any solids or precipitates are removed by centrifugal clarifiers. The clarified liquor is then pasteurized. The liquor is then fed into an ultrafiltration membrane unit. Appropriate steps are take to limit microbial spoilage during ultrafiltration. The retentate is condensed and spray dried. Protein products of 25% or more whey protein can be prepared by this process. Commercial products generally comprises 40–80% protein (N×6.38), 10–30% lactose, 3–15% ash, and 0.4–4% fat. This product is available commercially under the name ENR-PRO ® and the designation "made from grade A milk" from Stauffer Chemical Company, Food Ingredients Division, Westport, Connecticut. Products having high or lower protein contents are also available.

The non-fat dried milk used in the present invention can be either low heat, medium heat or high heat non-fat dried milk, i.e., an indication of the heat exposure received during drying. In drying the milk, a portion of the non-casein milk protein is denatured. This denaturation of the non-casein proteins of milk by heat is used to determine the amount of heat exposure received by the milk. After precipitation of the casein, a determination is made of the amount of protein left in the whey. This procedure, developed by Harland and Ashworth, J. Dairy Science 28 879 (1945) is designated as the whey protein nitrogen test. With this test, high heat non-fat dried milk is defined for use herein as having not over 1.5 milligrams whey protein nitrogen per gram of milk powder. The other two known forms of non-fat dried milk, i.e., low heat and medium heat, are categorized as follows: low heat, not less than 6.0 milligrams/gram and medium heat over 1.5 but less than 6.0 milligrams/gram.

The preferred non-fat dried milk is high heat non-fat dried milk. Slightly less effective results are obtained using the low heat product.

High heat non-fat dried milk is usually prepared by drying the milk on a rotating steam heated drum or roller. Low heat non-fat dried milk is usually prepared by spray drying. For the preferred high heat non-fat dried milk, any drying process can be used as long as the product has less than 1.5 milligrams whey protein nitrogen per gram of milk powder.

The acidic soft drinks which can be fortified with protein in accordance with the present invention include any acidic soft drink, either natural or formulated, which has a final pH between the range of from about 3.1 to about 3.9. These include cola, root beer, citrus and citrus flavored drinks including natrual orange juice, lemonade, lime, lemon-lime and the like. The soft drink can be carbonated or non-carbonated as desired though a carbonated beverage is preferred. The drinks which are most typically within the stated pH range are the citrus flavored type. A typical composition includes 11% sugar, 88% water, and 0.23% citric acid.

When preparing a soft drink within the range of pH 3.1 to 3.7, it is preferred to use the combination of the whey protein concentrate and the non-fat dried milk for a stable suspension. At pH's above 3.7, a precipitate is formed when using this combination. When using the combination of the whey protein concentrate and the non-fat dried milk, it is preferred that the pH be maintained at pH 3.2–3.5±0.1 and more preferably pH 3.5±0.05. The whey protein concentrate is preferably derived from acid (cottage) cheese whey and the non-fat dried milk is preferably high-heat non-fat dried milk.

When using the combination of the whey protein concentrate and the non-fat dried milk, it is preferred to use a combination comprised of from about 50% to about 95% and preferably from about 75% to about 90% acidic cheese whey protein concentrate and from about 50% to about 5% and preferably from about 25% to about 10% non-fat dried milk.

When preparing a soft drink with a pH within the range of from about 3.7 to about 3.9 and most preferably 3.8±0.05, the most effective results can be achieved using whey protein concentrate alone. At pH's of 4.0, and above, a precipitate is formed. A turbid drink is provided by using the whey protein concentrate alone at a pH of between 3.1 and 3.9. However, the most effective turbidity using the concentrate alone is achieved at 2 pH of between 3.7 and 3.9. If the final drink has a pH of between 3.1 and 3.7, the combination with the non-fat dried milk is preferred. At a pH of 3, the soft drink solution is clear. At a pH within the range of 3.7 to 3.9, a suspension providing the desired degree of turbidity is obtained which will not precipitate upon storage either before or after pasteurization of the soft drink.

The amount of turbidity provided is dependent on the type of soft drink prepared and the amount of whey protein concentrate used. Turbidity levels can be increased or decreased by increasing or decreasing the amount of the whey concentrate and, if applicable, the level of non-fat dried milk as desired to satisfy the demand of the market. Appropriate levels can be easily determined by one skilled in the art.

The extent of protein fortification can also be likwise increased or decreased. A sufficient amount of protein fortifier should be used to provide at least 0.1% by weight protein in the final drink. The preferred maximum protein fortification level is up to about 5%. It is preferred that the protein fortification range in amounts of from 0.1 to about 1%, based on Kjeldahl nitrogen. The actual amount of fortifier needed to attain these levels is dependent on the percentage protein therein. For instance, a protein concentrate having 50% protein would be used within the amounts of from about 0.2% to about 2.0% to achieve the preferred amounts of 0.1% to 1%. The exact amounts can be easily calculated by one skilled in the art.

It has been found that the compositions of the invention at the pH's stated are resistant to thermal denaturation and precipitation. The soft drinks fortified in accordance with the present invention can be pasteurized without a precipitation of the protein.

The invention will be more fully illustrated in the examples which follow.

EXAMPLES 1–9

Various protein enriched citrus soft drinks were prepared by blending a protein fortifier with a commercial citrus soft drink formulation containing sugar, water, citric acid monohydrate, artificial color (yellow No. 5) and preservatives (sodium benzoate). The protein fortifier was dissolved in water prior to addition. A sufficient amount of protein fortifier was used to provide a protein content in the soft drink of 0.25% by weight protein (0.25 grams) in 100 grams of liquid. For test purposes, the drinks were non-carbonated. Samples were tested for flavor acceptability and light transmittance. Flavor acceptability was determined organoleptically. Light transmittance of a non-fortified soft drink was about 100%.

The results are reported in Table I below.

TABLE I

| Example | | 1 | 2 | 3 | 4 | 5 | 6 | 7 | 8 | 9 |
|---|---|---|---|---|---|---|---|---|---|---|
| Protein Fortifier | | | | | | | | | | |
| Ultrafiltration process of Concentration | | | | *** | | | | | | |
| From Cottage Whey** | | 11.35 g | 10.0 | 11.35 | — | — | — | 9.54 | 10.0 | 9.54 |
| Heated at 82.8° C. (180° F.) for two minutes | | — | — | — | 11.35 | — | — | — | — | — |
| Homogenized | | — | — | — | — | 11.35 | — | — | — | — |
| From Cheddar whey | | — | — | — | — | — | 11.35 | — | — | — |
| Non-Fat Dried Milk | | | | | | | | | | |
| High Heat | | — | 1.85 | — | — | — | — | 2.5 | — | — |
| Low Heat | | — | — | — | — | — | — | — | 1.85 | 2.5 |
| pH of Final Solution | | 3.6 | 3.5 | 3.5 | 3.4 | 3.35 | 3.65 | 3.5 | 3.5 | 3.6 |
| Light Transmittance - | Beckman Spectrophotometer, Model DB-G | 81% | 67% | 90% | 92%* | 85% | 55% | 62% | 72% | 73% |
| (Wave Length - 640 nm) | Bausch & Lomb, Model 340-Spectrophotometer | 77.5% | 64.8% | 86% | 67% | 82% | 54% | 59% | — | — |
| Flavor - Bland or citrus | | X | X | | | | | X | X | X |
| Milky | | | | | | | X | | | |

*Sample Precipitated to bottom leaving clear solution.
**FNRPRO 50, Stauffer Chemical Company, 50% whey protein
***ENRPRO 31, Stauffer Chemical Company, 31% whey protein From these data, it can be seen that effective clouding of the liquid was only attained in Examples 2, 6 and 7. The product of Examples 2 and 7 had a citrus flavor and the product of Example 6 had a milky flavor. A comparison of the results of Examples 2 and 7 with Examples 8 and 9 (using low heat non-fat dried milk) show the advantage of using the high heat non-fat dried milk in the compositions of the present invention. Clouding is also shown by the use of lesser amounts of protein as in Example 3 wherein only 0.146% protein was used.

EXAMPLES 10-14

Experiments were run to determine the effect of pasteurization on the stability of the suspension. Citrus soft drinks as described in Example 1 were tested for light transmittance (wave length 625 nm) on a Bausch and Lomb Spectrophotometer before and after pasteurization at 65.6° C. (150° F.) for five minutes. The results are reported in Table II below. The light transmittance results of Examples 10-14 cannot be correlated with the like results found in Examples 1-9 since the wave lengths used in the tests were different.

Examples 10, 11 and 12 were run with different lots of a whey protein concentrate sold under the name ENRPRO-50 and the description "prepared from Grade A milk". The same whey protein concentrate was used in Examples 12 and 13. Each sample had a protein content of 0.25% by weight protein, (0.25 grams protein per 100 grams liquid).

TABLE II

| | | Before Pasteurization | | After Pasteurization | |
|---|---|---|---|---|---|
| Example | pH | Appearance | Percent Light Trans. | Appearance | Percent Light Trans. |
| Example 10 | 2.8 | Clear | 55 | Clear | 74 |
| | 3.0 | Clear | 54 | Clear | 67 |
| 85% Whey Protein Concentrate/ 15% high heat non-fat dried milk | 3.5 | Sl. Cloudy | 50 | Cloudy | 33 |
| | 3.8 | ppt. | 20 | ppt. | 25 |
| | 4.0 | ppt. | 27 | ppt. | 20 |
| Example 11 | 2.8 | Clear | 73 | Clear | 90 |
| | 3.0 | Clear | 71 | Clear | 84 |
| 85% Whey Protein Concentrate/ 15% high heat non-fat dried milk | 3.5 | Clear | 67 | Sl. Cloudy | 54 |
| | 3.8 | Cloudy | 43 | ppt. | 9 |
| | 4.0 | ppt. | 18 | ppt. | 5 |
| Example 12 | 2.8 | Clear | 49 | Clear | 69 |
| | 3.0 | Clear | 40 | Clear | 64 |
| 85% Whey protein concentrate/ 15% high heat non-fat dried milk | 3.5 | Cloudy | 34 | Cloudy | 36 |
| | 3.8 | Sl. ppt. | 24 | ppt. | 8 |
| | 4.0 | ppt. | 12 | ppt. | 5 |
| Example 13 | 2.8 | Clear | 59 | Clear | 67 |
| | 3.0 | Clear | 56 | Clear | 54 |
| Whey protein concentrate (Same as used in Example 12) | 3.5 | Sl. Cloudy | 49 | Sl. Cloudy | 52 |
| | 3.8 | Cloudy | 36 | Cloudy | 16 |
| | 4.0 | ppt. | 18 | ppt. | 5 |
| Example 14 | 2.8 | — | — | — | — |
| | 3.0 | — | — | — | — |

TABLE II-continued

| Example | Before Pasteurization | | | After Pasteurization | |
|---|---|---|---|---|---|
| | pH | Appearance | Percent Light Trans. | Appearance | Percent Light Trans. |
| High heat non-fat dried milk | 3.5 | Cloudy | 2 | Cloudy | 2 |
| | 3.8 | ppt. | 2 | ppt. | 2 |
| | 4.0 | ppt. | 2 | ppt. | 2 |

From these data, it can be seen that blends of whey protein concentrate and high heat non-fat dried milk (Examples 10, 11 and 12) all remain in solution at a pH of 3.5. However, all of these compositions produce a precipitate at pH 3.8 after pasteurization.

Example 13 shows that the acidic cheese whey protein concentrate when used alone is most effective pH 3.8. A precipitate is formed at pH 4.0.

These data also show that all samples were clear at pH 3.0 both before and after pasteurization. All samples were cloudy at pH of 3.5 after pasteurization. A pH above 3.0 should be used if turbidity is desired.

EXAMPLES 15 AND 16

The following examples were run to determine whether denatured acidic whey protein concentrate could be used in place of the high heat non-fat dried milk. Citrus soft drinks as described in Example 1 prepared with protein fortifier compositions denatured whey protein concentrate in place of high heat non-fat dried milk were tested for light transmittance before and after pasteurization using a Bausch and Lomb Spectrophotometer set at a wave length of 625 nm. The following results were obtained: Each sample had a protein content of 0.25% by weight protein (0.25 grams protein in 100 grams of liquid).

TABLE III

| Example | pH | Before Pasteurization | | After Pasteurization | |
|---|---|---|---|---|---|
| | | Appearance | Light Trans. % | Appearance | Light Trans. % |
| Example 15 | 3.5 | Sl. ppt. | 18 | Sl. ppt. and dark oily film | 24 |
| 85% whey concentrate, 15% denatured concentrate | 3.8 | ppt. and dark spume | 8 | ppt. and dark spume | 36 |
| Example 16 | 3.5 | acceptable | 14 | acceptable | 11 |
| 85% whey concentrate, 15% high heat non-fat dried milk | 3.8 | ppt. | 5 | ppt. | 38 |

These data show that denatured acidic whey protein concentrate cannot be used in place of high heat non-fat dried milk in the compositions of the invention.

The invention is more fully defined in the claims which follow.

What is claimed is:

1. A method for fortifying liquid acidic soft drinks having a pH within the range of from about 3.1 to about 3.7 with protein while providing a turbid stable suspension therein which does not settle after one month having from about 67% to about 16% light transmittance as measured by a Beckman Spectrophotometer Model DB-G at wave length 640 nm which comprises admixing with said acidic soft drink a protein fortifier composition comprising from about 50% to about 95% of cheese whey protein concentrate having a protein solids concentration between about 25% and about 60% by weight on a dry basis prepared by ultrafiltration of acid cheese whey in combination with from about 5% to about 50% high heat non-fat dried milk, said protein fortifier being admixed in an amount sufficient to add from about 0.1% to about 5% by weight protein based on the total weight of the soft drink, said percentages unless otherwise stated being by weight based on the combined dry weight of said protein concentrate and said non-fat dried milk.

2. The method as recited in claim 1 wherein the pH of said acid soft drink admixed with said protein fortifier composition is within the range of from about 3.2 to about 3.5.

3. The method as recited in claim 2 wherein said pH is about 3.5±0.05.

4. The method as recited in claim 1 wherein the whey protein concentrate has a protein concentration of between about 40 and 60% by weight.

5. The method as recited in claim 1 wherein said composition is comprised of from about 75% to about 90% of said cheese whey protein concentrate and from about 10% to about 25% of said non-fat dried milk.

6. The method as recited in claim 1 wherein said acidic soft drink is a carbonated citrus drink.

7. The product of the method of claim 1.

8. A protein fortifier composition for providing liquid acidic soft drinks having a final protein fortification and a turbid stable suspension therein which does not settle after one month having from about 67% to about 16% light transmittance as measured by a Beckman Spectrophotometer Model DB-G at wave length 640 nm comprising from about 50% to about 95% cheese whey protein concentrate having a protein solids concentration between about 25% and 60% by weight on a dry basis prepared by the ultrafiltration of acid cheese whey and from about 50% to about 5% high heat non-fat dried milk, said percentages unless otherwise stated being by weight based on the combined dry weight of the protein concentrate and the non-fat dried milk.

9. The protein fortifier composition as recited in claim 8 wherein said cheese whey protein concentrate is present in an amount ranging from about 75% to about 90% and said non-fat dried milk is present in an amount ranging from about 10% to about 25%.

10. The protein fortifier composition as recited in claim 8 wherein said whey protein concentrate has a whey protein concentration ranging from about 40% to about 60% by weight.

11. The protein fortifier composition is recited in claim 8 wherein said acid cheese whey prior to concentration by ultrafiltration is a neutralized and pasteurized cottage cheese whey.

* * * * *